(12) United States Patent
Eickholt et al.

(10) Patent No.: US 11,369,120 B2
(45) Date of Patent: Jun. 28, 2022

(54) COATED SHELL-LESS COOKED EGG PRODUCT AND METHOD

(71) Applicants: David P. J. Eickholt, St. Louis Park, MN (US); Claire M. Eickholt, St. Louis Park, MN (US)

(72) Inventors: David P. J. Eickholt, St. Louis Park, MN (US); Claire M. Eickholt, St. Louis Park, MN (US)

( * ) Notice: Subject to any disclaimer, the term of this patent is extended or adjusted under 35 U.S.C. 154(b) by 0 days.

(21) Appl. No.: 17/441,986

(22) PCT Filed: Apr. 16, 2020

(86) PCT No.: PCT/US2020/028419
§ 371 (c)(1),
(2) Date: Sep. 22, 2021

(87) PCT Pub. No.: WO2020/219326
PCT Pub. Date: Oct. 29, 2020

(65) Prior Publication Data
US 2022/0132875 A1    May 5, 2022

Related U.S. Application Data

(60) Provisional application No. 62/836,874, filed on Apr. 22, 2019.

(51) Int. Cl.
*A23B 5/06*     (2006.01)
*A23B 5/14*     (2006.01)
(Continued)

(52) U.S. Cl.
CPC .................. *A23B 5/06* (2013.01); *A23B 5/14* (2013.01); *A23B 5/18* (2013.01); *A23L 15/30* (2016.08);
(Continued)

(58) Field of Classification Search
CPC .... A23B 6/06; A23B 6/14; A23B 6/18; A23L 15/30; B65D 75/68; B65D 85/70; A23V 2002/00
See application file for complete search history.

(56) References Cited

U.S. PATENT DOCUMENTS 2,333,887 A    11/1943   Redlinger
D147,994 S    11/1947   Siessmayr
(Continued)

FOREIGN PATENT DOCUMENTS

| EP | 1900291 | * 12/2008 |
| WO | 1998034493 A1 | 8/1998 |
| WO | 2006056561 A1 | 6/2006 |

OTHER PUBLICATIONS

Translation for EP1900291 published Dec. 2008.*
(Continued)

*Primary Examiner* — Anthony J Weier
(74) *Attorney, Agent, or Firm* — Davis & Kuelthau, s.c.

(57) ABSTRACT

A coated shell-less cooked egg product and method for making same. The coated product includes a shell-less cooked egg product. And, a strip encircling at least 50% of a circumference of the egg product, the egg product having a first end and a second end. Also, a coating enclosing (i) substantially all of a surface area of the egg product and (ii) at least 75% of the strip and as much as 100% of the strip. At least a first end of the strip extends away from the egg product so the first end of the strip can be grasped to assist in removal of the coating from the egg product during a peeling phase. The coating may include a first coating layer and a second coating layer.

37 Claims, 9 Drawing Sheets

(51) Int. Cl.
  *A23B 5/18* (2006.01)
  *B65D 75/68* (2006.01)
  *B65D 85/00* (2006.01)
  *A23L 15/00* (2016.01)
(52) U.S. Cl.
  CPC .............. *B65D 75/68* (2013.01); *B65D 85/70* (2013.01); *A23V 2002/00* (2013.01)

(56) References Cited

U.S. PATENT DOCUMENTS

| | | | |
|---|---|---|---|
| 2,660,530 | A | 11/1953 | David |
| 2,713,881 | A * | 7/1955 | Shideler ................. A47G 19/28 426/299 |
| 3,285,749 | A * | 11/1966 | Shires .................... A23L 15/10 426/414 |
| D421,216 | S | 2/2000 | Abrams et al. |
| 6,099,872 | A * | 8/2000 | Whetstone, Jr. ......... A23G 3/50 426/138 |
| D434,978 | S | 12/2000 | Thill |
| D478,681 | S | 8/2003 | Newcomb |
| D480,396 | S | 10/2003 | Buckner |
| D563,593 | S | 3/2008 | Audrito |
| D608,160 | S | 1/2010 | Colbert et al. |
| D608,826 | S | 1/2010 | Laguatan et al. |
| 8,202,559 | B2 * | 6/2012 | Leimkuhler ....... B65D 81/3461 426/123 |
| D670,852 | S | 11/2012 | Lin |
| D703,415 | S | 4/2014 | Khan |
| D797,190 | S | 9/2017 | Laemle |
| D817,505 | S | 5/2018 | Luntz et al. |
| D852,968 | S | 7/2019 | Luntz et al. |
| 2003/0017237 | A1 | 1/2003 | Poupard et al. |
| 2005/0158442 | A1 | 7/2005 | Westermann et al. |

OTHER PUBLICATIONS

Translation for WO98034493 published 13/1998.*
Babybel—Wikipedia, 3 pages, available at least as early as Feb. 8, 2019, copy filed herewith.
Hillside Homestead Historic Farmstay, To Keep Eggs . . . Using Beeswax and Oats . . . WithoutRefrigeration . . . at Hillside Homestead, on the internet 8 pages, available at least as early as Feb. 8, 2019, copy filed herewith, and at this address: https://hillsidehomestead.com/.../to-keep-eggs-using-beeswax-and-oats-without-refrigeration.
Jackson, Danielle, "12 Easter Egg Hacks That Will Make Your Life Easier", Insider, Apr. 10, 2017, Web, Jun. 18, 2021, <https://www.insider.com/easter-egg-hacks-2017-4>, 16 pages filed herewith.
Keto in the City, Vital Farms Eggs, on the internet, 19 pages, available at least as early as Feb. 8, 2019, copy filed herewith, and at this address: https://ketointhecity.com/blog/2018/4/2/vital-farms-makes-butter-now.
Search Report & Written Opinion for PCT Patent Application No. PCT/US2020/28419, "Coated Shell-Less Cooked Egg Product and Method" dated Jul. 17, 2020, 11 pages filed herewith.
The Crakin' Egg Co., on the internet, 7 pages, available at least as early as Feb. 8, 2019, copy filed herewith, and at this address: http://crackineggco.co.uk/.
webichi.com, Tenga Tenga Egg Hard Boiled Package Egg-vp6(2), 3 pages, available at least as early as Feb. 8, 2019, copy filed herewith.
Willamette Egg Farms, Hard Boiled Eggs, on the internet, 5 pages, available at least as early as Feb. 8, 2019, copy filed herewith, and at this address: http://www.willametteegg.com.s3-website-us-west-2.amazonaws.com/our-products/hard-boiled/index.html.

* cited by examiner

COATED SHELL-LESS COOKED EGG PRODUCT AND METHOD

TECHNICAL FIELD

This invention relates to the packaging of consumer food products, and in particular a cooked egg product such as a whole egg. As a perishable food, a unique package provides a convenient serving size while both preserving and protecting a cooked egg product before consumption, and enabling easy access to the egg product when consumption is desired.

BACKGROUND

In many consumer packaging applications, it is important to prevent air, water or other contaminates from passing out of or into the package. This is particularly true with respect to perishable foods, like a cooked egg product such as a soft-boiled to hard-boiled egg, and even more so for a shell-less cooked egg product. Such a product must be kept in a controlled environment to prevent spoilage and deterioration. In order to preserve the integrity and safety of such an egg product contained within a package, the circumference of the product should be hermetically sealed from the outer environment, and the package should also serve to protect the product during shipping from bumps and jostling.

It is known from various prior art documents to protect food, including cheese, meat and raw/uncooked eggs, against deterioration by means of a surrounding film consisting of an impermeable flexible coating material such as wax, covering the food product. For cheese, it is also known to place a strip under the coating material and against the food, and which has an end protruding from the outer surface of the coating material and alongside a surface of the product, thereby enabling the cheese to be disengaged from the coating material after the strip has been removed.

The entire packaging process in which a cheese product is covered with the protecting wax layer and with the tear strip takes place under strict environmental conditions required to extend shelf life, which is complicated, expensive and proprietary. Add to this the fact that no one has yet tried to do this for a cooked egg product shaped like a whole egg, and in particular a shell-less cooked egg product, including such as a whole egg, and the complications are multiplied.

There is a need for a product and method for packaging and opening a cooked egg product in an effective and efficient manner, with a new to the world package and method.

SUMMARY

To help address one or more of the needs identified above, for example, there is provided a coated shell-less cooked egg product. The coated product includes a shell-less cooked egg product. It also includes a strip encircling at least 50% of a circumference of the egg product, the egg product having a first end and a second end. And, it also includes a coating enclosing (i) substantially all of a surface area of the egg product and (ii) at least 75% of the strip and as much as 100% of the strip. At least a first end of the strip extends away from the egg product so the first end of the strip can be grasped to assist in removal of the coating from the egg product during a peeling phase.

In another embodiment, there is a coated shell-less cooked egg product. This coated product includes a shell-less cooked egg product. It also includes a strip encircling at least 50% of a longitudinal circumference, the longitudinal circumference including a first end a second end of the egg product. The coated product further includes a coating. The coating encloses (i) substantially all of a surface area of the egg product and (ii) at least 75% of the strip and as much as 100% of the strip. At least a first end of the strip extends away from the egg product so the first end of the strip can be grasped to assist in removal of the coating from the egg product during a peeling phase. The coating includes a first coating layer and a second coating layer where the first coating layer encloses (i) the first end of the egg and at least 50% of the surface area of the egg and (ii) at least 50% to less than 100% of the strip.

Also described is yet another embodiment of a coated shell-less cooked egg product. This embodiment includes a shell-less cooked egg product. It also includes a strip encircling at least 50% of a circumference of the egg product, the egg product having a first end and a second end and a surface of the egg product is resilient. And, a coating is enclosing (i) substantially all of a surface area of the egg product and (ii) at least 75% of the strip and as much as 100% of the strip. At least a first end of the strip extends away from the egg product so the first end of the strip can be grasped to assist in removal of the coating from the egg product during a removal peeling. Further the coated product includes a salt and an acetic acid added to at least the surface of the egg product.

In still another embodiment, there is a coated shell-less cooked egg product. This embodiment includes a shell-less cooked egg product. It also includes a strip encircling at least 50% and less than 100% of a circumference of the egg product, the egg product having a first end and a second end. Further, it includes a coating enclosing (i) substantially all of a surface area of the egg product and (ii) at least 75% of the strip and as much as 100% of the strip. At least a first end of the strip extends away from the egg product so the first end of the strip can be grasped to assist in removal of the coating from the egg product during a peeling phase. The coating includes a first coating layer and a second coating layer where the first coating layer encloses (i) the first end of the egg and at least 50% of the surface area of the egg and (ii) at least 50% to less than 100% of the strip. The second coating layer encloses (i) between 10% and 90% of a surface area of the first coating layer including the second end of the egg and (ii) substantially all of the strip that is not enclosed by the first coating layer. A salt is added to at least a surface of the egg product.

As another embodiment, there is described a method for making a coated shell-less cooked egg product. The method includes providing a shell-less cooked egg product. It also includes encircling at least 50% of a circumference of the egg product with a strip, the egg product having a first end and a second end. Another steps is enclosing (i) substantially all of a surface area of the egg product with a coating and (ii) at least 75% of the strip and as much as 100% of the strip with the coating. Further, the method includes extending at least a first end of the strip away from the egg product so the first end of the strip can be grasped to assist in removal of the coating from the egg product during a peeling step.

BRIEF DESCRIPTION OF THE DRAWINGS

The coated shell-less cooked egg product may be more completely understood in consideration of the following detailed description of various embodiments of the coated product in connection with the accompanying drawings, in which.

Figure 1:
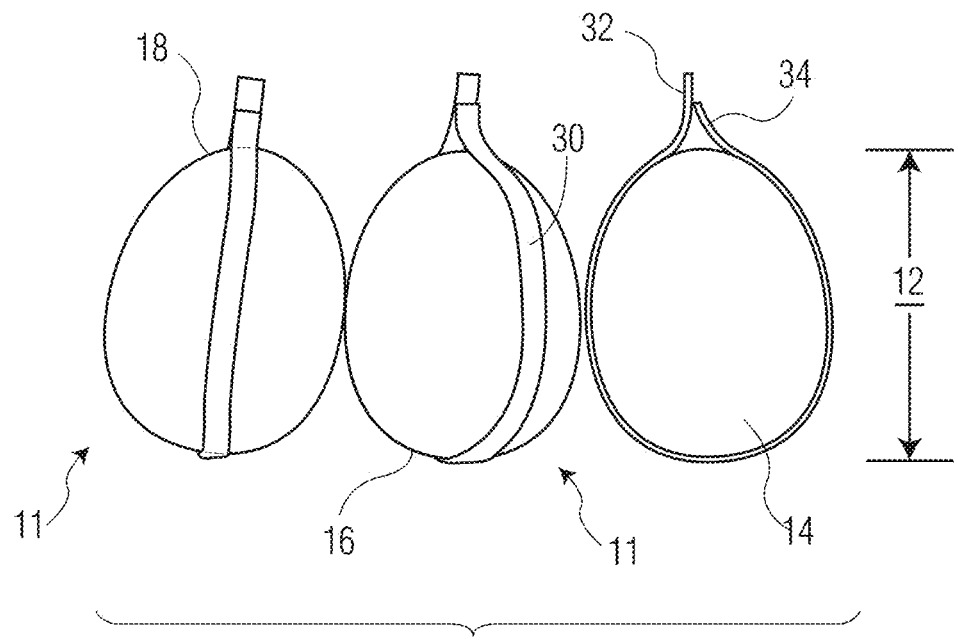
FIG. 1 is a front view of shell-less cooked egg product on their way to become coated shell-less cooked egg product.

The drawings show some but not all embodiments. The elements depicted in the drawings are illustrative and not necessarily to scale, and the same (or similar) reference numbers denote the same (or similar) features throughout the drawings.

DETAILED DESCRIPTION

In accordance with the practice of at least one embodiment of the coated product, is a portable, single-serve (or multiple individual-like servings) opportunity based on a functional package unlike ever before. In reference to FIGS. 4-9, for example, there is a coated shell-less cooked egg product 10. The coated product may be a whole egg (i.e., as it comes out of the animal) cooked in its shell and then the shell removed to be a shell-less cooked egg product, or it could be a manufactured egg-shaped product that consists of egg ingredients and/or select egg parts (e.g., egg whites only, egg white proteins only, yolks only, or the like) that are already out of the shell and cooked when in an egg shape to be a shell-less cooked egg product, or other edible ingredients that never were in a shell (e.g. plant and/or animal based proteins, fruit and/or grain extracts) or ingredients now out of the shell, alone or in combination with other food products, and are cooked when in an egg shape to be a shell-less cooked egg product. As used herein, "cooked" also includes any way to make the egg product ready to eat by a human which may or may not literally require cooking of the egg product.

The coated product 10 includes a strip 30 encircling at least 50% of a circumference of the egg, and up to 55%, 60%, 65%, 70%, 75%, 80%, 85%, 90%, 95%, and 100%, if desired, as seen in varying degrees of the examples in FIGS. 1-9. Further, the strip may, and often is, only encircling a portion of the circumference and less than 100%, as can be clearly seen in FIG. 2A where the portion of the strip in dotted lines indicates an optional portion removed and thus that portion of the circumference 12 not being encircled by strip 30. In another aspect of the strip, it may be directly encircling the egg product by being placed right next to a surface 14 of the egg product or be indirectly encircling the egg product by having another structure(s) (e.g., a layer(s) of wax on a side of the strip) interposed between the strip and the egg product surface 14.

The strip has a first end 32 and a second end 34. At least one of the first end and the second end extends away from the egg product, e.g., an end of the egg, and may be with or without a coating (as explained further below) thereon. Preferably, both the first and second ends 32, 34 may extend away from a same end of the egg, e.g., second end 18, and each may be with or without the coating. While the circumference of the egg product could be defined between the ends, more specifically around the middle like a person wears a belt, preferably, and as seen throughout the Figures, the circumference of the egg may be a longitudinal circumference 12 including the first end 16 and second end 18 of the egg product 10.

Without being limited to a particular theory of understanding, the inventors have surprisingly found that a significant challenge to making a quality coated egg product is the shell-less cooked egg product surface 14 being slippery and/or resilient. That is, especially as compared to other packaged products, the shell-less cooked egg product surface is resilient (i.e., malleable or soft) and will change shape or deform yet largely return to its original shape when an external force is applied and released, provided the force does not puncture the surface or does not puncture it too much. Additionally, in combination with one or more of: the resiliency of the surface, the concave shape, the smooth texture, and/or the high moisture content of the cooked egg product, such make handling and coating difficult. The amount of resilience or malleability can be dependent on a variety of factors, including the cooked level of the egg product (e.g., using a whole egg as a reference point —from soft-boiled to medium-boiled to hard-boiled, all of these being a function of how long (and when cooked not in water, how hot) the egg is cooked), and/or other additive(s) to the egg product, like some or all of the surface 14. For example, this can be a salt added to at least the surface of the egg product, preferably by brining before incorporating the cooked egg product into coated egg product 10. Such brining can be by a conventional process as one of ordinary skill in the art would know to do in conjunction with the teachings herein. Alternately, or additionally, the additive can be an acetic acid added to at least the surface of the egg product, e.g., use of vinegar. Such use of acetic acid can be by a conventional process as one of ordinary skill in the art would know to do in conjunction with the teachings herein. For example, the use or salt and/or acetic acid, and in varying amounts, can also contribute to protein crosslinking and/or osmotic pressure control to better manage egg expansion when formed into a coated egg product, including resilience of the surface of the egg product.

The egg product 11 has a first end 16 and a second end 18. A coating encloses substantially all of the surface area of the egg product and at least 75% of the strip 30 and as much as 100% of the strip. In follow up to the discussion above, at least the first end 32 of the strip extends away from the egg product so the first end 32 can be grasped to assist in removal of the coating from the egg product during a peeling phase (e.g., FIGS. 10-11, and as explained further below with the method). For example, preferably the coating includes the first coating layer 60 and the second coating layer 80. More preferably, the first coating layer encloses the first end of the egg and at least 50% of the surface area of the egg, and even as much as 55%, 60%, 65%, 70%, 75%, 80%, 85%, 90%, 95%, and 100%, if desired, as seen in varying degrees of the examples in FIGS. 1-9. The first coating layer 60 may enclose at least 50% to less than 100% of the strip, and up to 55%, 60%, 65%, 70%, 75%, 80%, 85%, 90% and 95%, if desired, as seen in varying degrees of the examples in FIGS. 1-9. The first coating layer preferably has a thickness of about 1.2 mm+/−0.3 mm, as too thin won't cover the thickness of the strip and may not have enough strength, and too thick makes peeling difficult and is wasteful from a packaging standpoint.

Referring to FIGS. 8-11, even more preferably, the second coating layer 80 can enclose between 10% and 90% of a surface area of the first coating layer 60 including the second end 18 of the egg, and at least 15%, 20%, 25%, 30% and no more than 80%, 70%, 60%, 50%, if desired, as seen in some examples in FIGS. 8-11. The second coating layer preferably has a thickness of about 0.35 mm+/−0.15 mm, as too thick and there is an accumulation of wax at the top of the egg product that makes peeling quite difficult, but not impossible. The second coating layer 80 can also enclose substantially all of the strip 30, if any, that is not enclosed by the first coating layer 60, and preferably all of the strip 30 that is not enclosed by the first coating layer 60. The second coating layer also has the advantage to help ensure potential points of failure in one or the other coating layer are strengthened by the combined layers, especially adjacent the strip and the second end 18.

Figure 10:
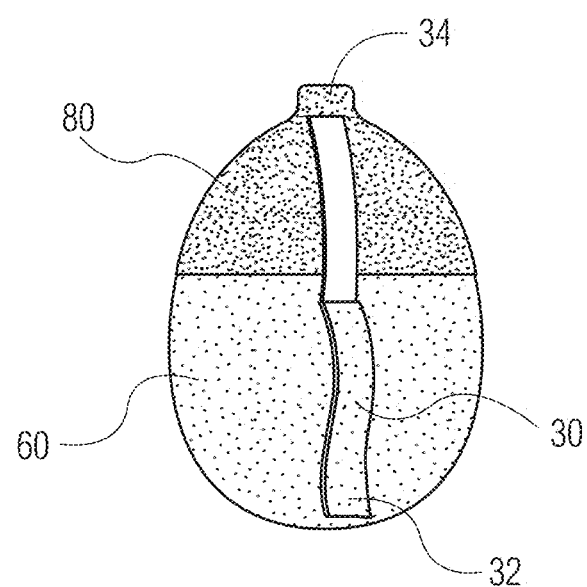
FIG. 10 is a front view of the coated shell-less cooked egg product partially peeled open by its strip after the user grasps the first end of the strip.
Figure 11:
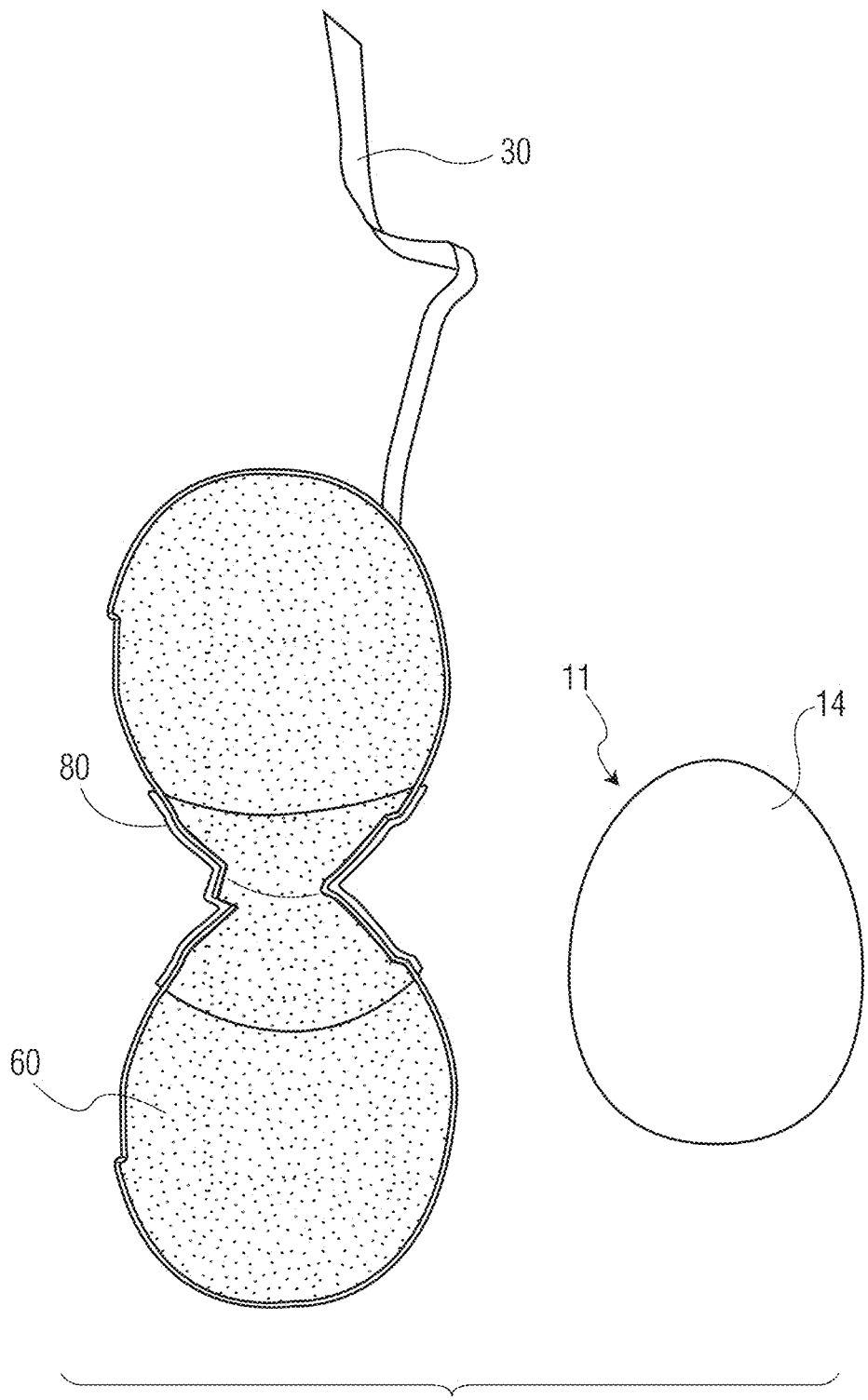
FIG. 11 is a top view of the coated shell-less cooked egg product of FIG. 10, now completely peeled open by its strip and the egg product separated from the coating layer(s)
Figure 12:
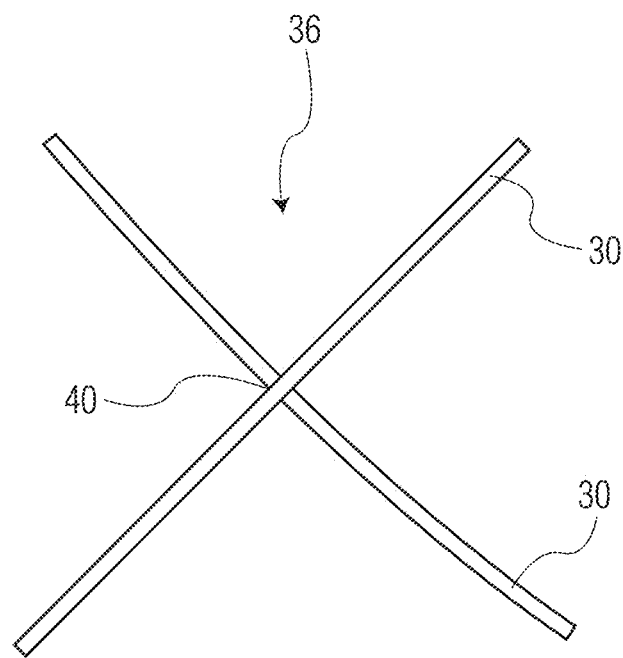
FIG. 12 is a top view of an x-shaped member as a cradle for use with the coated product.
Figure 13:
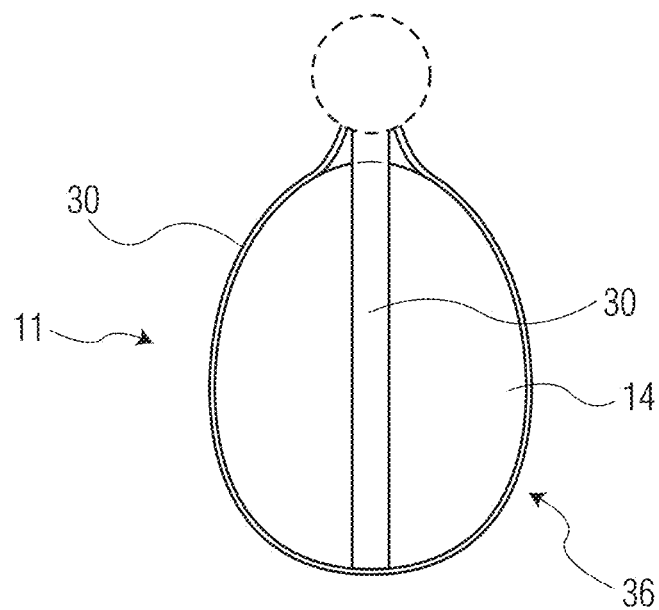
FIG. 13 is a side view of an x-shaped member wrapped around an egg product before adding the coating(s)
Figure 14:
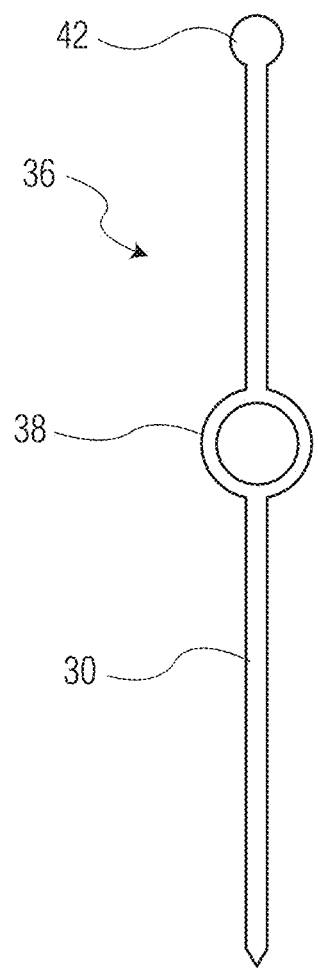
FIG. 14 is a top view of an open seat member as a cradle for use with the coated product and having a thumb tab; and, FIG. 15 is a bottom perspective view of an open seat member wrapped around an egg before adding the coating(s) to form the coated product.
Figure 15:
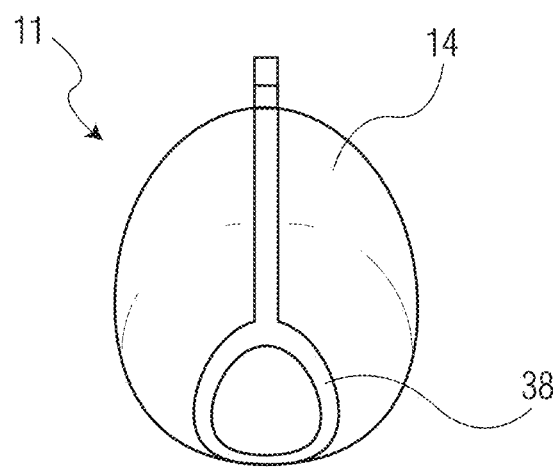

Other features of the coated egg product relate to the material making up the first and second coating layers. The first and second coatings may be a wax material. For example, the inventors have surprisingly found, after much experimentation and many failed compositions including bees wax, paraffin, microcrystalline, and different blends of paraffin and microcrystalline, that the wax material is preferably a blend of paraffin wax and microcrystalline wax, though all paraffin wax may be possible when the desired properties of the wax can still be achieved. Particularly, the blend or homogenous wax used needs to balance some competing properties such that the resulting composition (i) is not too brittle to be prone to cracking/shattering (e.g., especially under refrigeration), (ii) is soft enough to absorb bumps and blows encountered during shipment of the finished product, (iii) is food-safe, and/or (iv) is not too tacky to be difficult to remove cleanly when peeled from the egg (e.g., FIGS. 10 and 11 show a desired wax for the coating layers of the coated product and the wax removed cleanly when peeled from the egg). Without being limited to a particular theory, it is also believed that this enables complete emersion of the egg for coating instead of a more complicated process for other products, e.g., other products and processes may require a flashing before adding a wax coating layer. As a further feature, the second coating may be of a different wax material from the wax material of the first coating. The difference may lie in a color difference for aesthetic or signaling and/or other compositional differences as may be advantageous to the functioning of the coating layers to hermetically seal the egg from the outer environment and preserve its integrity and safety after coating, during shipping and until peeling and then consumption by a person.

Non-limiting examples of commercial wax that is suitable for use as the wax for the strip and wax for the coating, are as follows: duck wax (called Duck Wax™) and cheese wax (called BW-100J™) from Blended Waxes, Inc. (Oshkosh, Wis.), and a blending of duck wax with cheese wax to adjust the characteristics of the wax as taught here can be preferred. Additional options would be Witcovar-146 from Sonneborn LLC (Petrolia, Pa.), or other waxes with similar compositions. It is believed the mix of wax constituents best for practicing the coated product include paraffin wax and microcrystalline wax, such as a blend of about 25% to 100% paraffin with up to about 70% (and more preferably no more than about 50%) of microcrystalline.

Additional features of the coated product relate to the strip 30. Surprisingly, it took the inventors quite a bit of failed experimentation to develop an acceptable strip for use as part of the coated product. For example, the strip may include a pre-coating layer. The pre-coating may be a wax material, such as those already described. Preferably, the wax on the strip does not negatively interact with the wax used to coat the egg product. Ideally, when using the same wax to coat the strip and the egg product, a continuous wax layer is formed, so during the peeling phase a section of wax is removed, and the strip does not have to fight its way through the wax in a cutting motion. This makes the peeling phase/step much easier and reduces the likelihood the strip breaks during peeling and/or the egg is punctured during peeling phase (i.e., which does not ruin the egg, but lessens the ideal peeling experience desired). For example, this can be seen with peeling started in FIG. 10 and completed in FIG. 11, where the coating layers are completely peeled open by strip 30 and separated from the shell-less cooked egg product 11 that is now ready for consumption. Also, preferably, the wax material has a static coefficient of friction relative to the surface of the egg product that is sufficient to reduce movement of the egg product relative to the strip when the strip encircles the egg product in preparation for adding the coating, e.g., first coating layer. This can aid in handling the egg product more surely during coating, as well as to prevent cross marking on the soft egg product surface and/or for an easier grip when peeling open the coatings via the strip.

The strip may be a cloth material, and the cloth material pre-coated with the wax material. A non-limiting example of material that is particularly suitable for use as the strip is Muslin cloth, and the Muslin cloth can be cotton. The strip may have a preferred width of about 4.5 mm. If the strip is too small (e.g., 3.5 mm), it may cut into the egg product surface, damaging the egg product, and may not peel as desired. If the strip is too wide 5.5 mm), the edges may not lay flush with the egg product due to eggs products concave surface, and may protrude from the wax, which could impact the quality of the wax sealing desired. The strip may also have a thumb tab 42 to make easier to grip when peeling open the coatings via the strip. As seen in FIGS. 12-15, the strip could include a cradle 36 at the first or second end of the egg. The cradle may be an open seat member 38 or an X-shaped member 40. The cradle can aid in handling the egg more surely during coating.

Without being limited to a particular theory, the combination of elements that comprise the coated product have several advantages for a perishable food product like a shell-less cooked egg product. For example, the coated egg product can use fewer, and if desired essentially no, preservatives to help with storage as the coatings create an airtight seal to restrict aerobic microbial growth. The coated egg product can provide another, and even better, opportunity to sterilize the surface of the egg product as the molten liquid coating comes into direct contact with the egg product surface. Stated another way, the coated egg product disclosed here, preferably, has the desired amount of packaging. For example, if two egg products have different circumferences and/or longitudinal lengths, the surface area of each egg product can be quite different. Whole eggs in the US are graded by weight (mostly), so the sizes can vary considerably. Therefore, existing packages tend to be oversized, because they need to account for the variation in any given whole egg. Our product and method applies the desired amount of coating material to any shaped/sized egg product. It's pretty dang neat!

The coated egg product also includes a method for making a coated shell-less cooked egg product, as seen throughout the drawings, and preferably in sequential progression from FIG. 1 to FIG. 11. A first step is providing a shell-less cooked egg product. Next step, encircling at least 50% of a circumference of the egg product with a strip, the egg product having a first end and a second end. Then, enclosing (i) substantially all of a surface area of the egg product with a coating and (ii) at least 75% of the strip and as much as 100% of the strip with the coating, while extending at least a first end of the strip away from the egg product so the first end of the strip can be grasped to assist in removal of the coating from the egg product during a peeling step.

The method may further be where enclosing includes a first layer coating (i) the first end of the egg and at least 50% of the surface area of the egg and (ii) at least 50% to less than 100% of the strip. Additionally, in the method enclosing may include a second layer coating (i) between 10% and 90% of a surface area of the first coating layer including the second end of the egg and (ii) substantially all of the strip that is not enclosed by the first coating layer.

In other aspects of the method, it may be the first layer coating including the first end of the egg and between 50% and 90% of the surface area of the egg. Additionally or alternatively, encircling of the method may include less than 100% of the circumference of the egg product. Yet additionally or alternatively, the method may include the step of cradling the first end of the egg product with the strip and suspending the egg product with the strip proximate to the second end of the egg product.

In yet other aspects of the method, it may include exposing the egg product by peeling the strip away from the egg product. Further in this regard, peeling may be grasping the first end of the strip. And, related to this and only preferred, the method may include coating the strip in a pre-coating layer.

In still other aspects of the method, it may include adding salt to at least a surface of the egg product and/or adding an acetic acid to at least a surface of the egg product. It may also include adding any other additives for flavoring, nutritional improvement, food-safety improvements, storage improvements, and/or processing aides.

Figures 2, 2A:
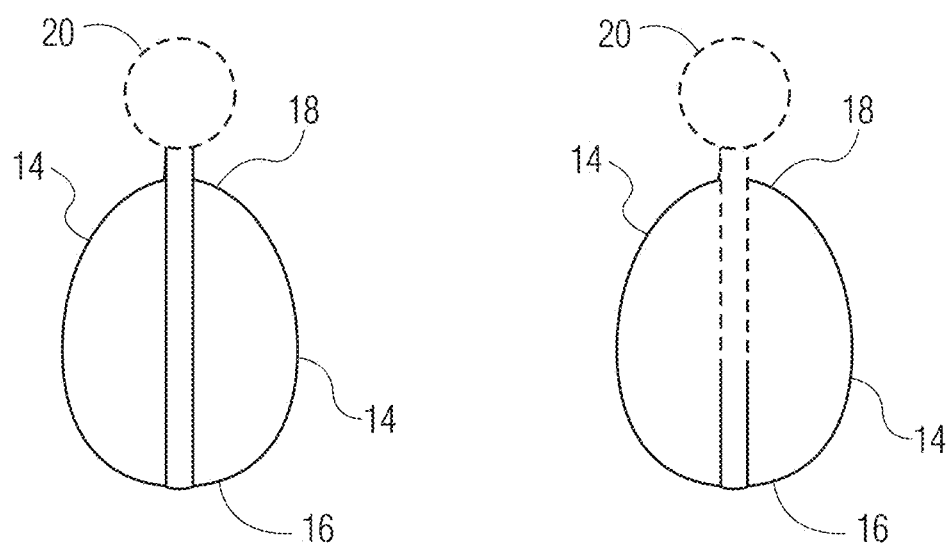
FIG. 2 is a side view of one shell-less cooked egg product seen in FIG. 1 being suspended by a product holder.
FIG. 2A is a side view of an alternate embodiment of one shell-less cooked egg product as seen in FIG. 2 but now with an optional portion of the strip shown in dotted lines.
Figure 3:
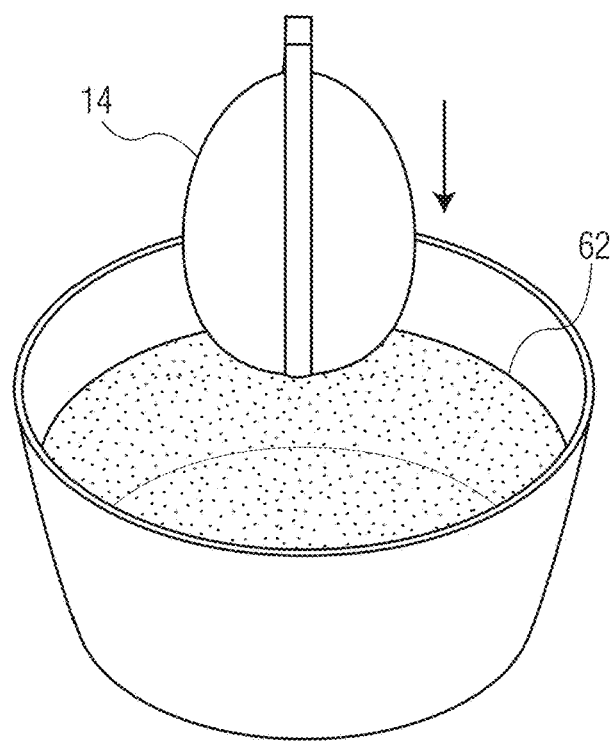
FIG. 3 is a side perspective view of the egg seen in FIG. 2, about to be dipped in coating, such as molten liquid wax.
Figure 4:
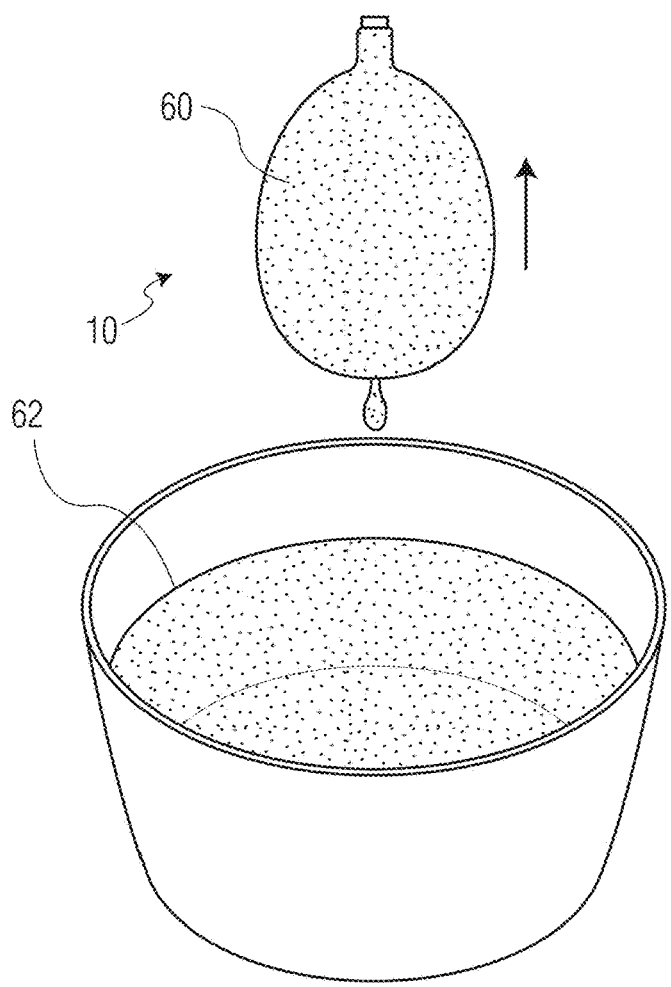
FIG. 4 a side perspective view of the egg product seen in FIG. 3, just after dipped to form a coating, such as a first coating layer (i.e., multiple dippings like this may occur to form the first coating layer too)
Figure 5:
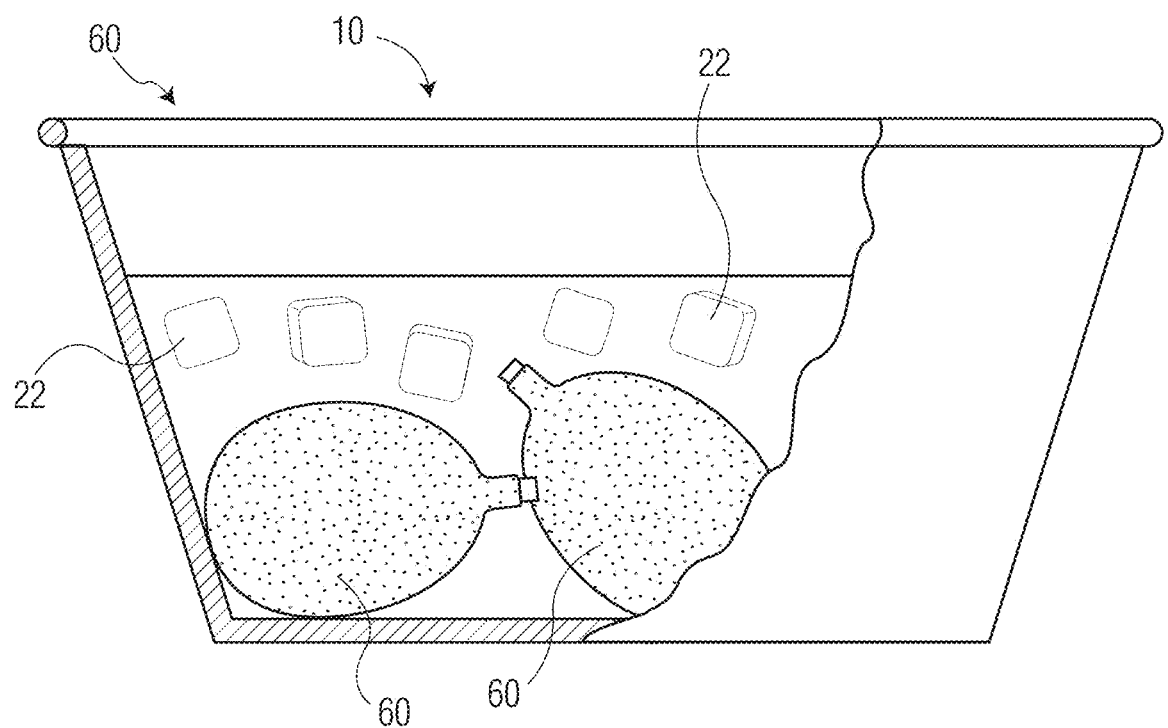
FIG. 5 is a side view with container partially cut-away showing egg products with the first coating layer in a cooling bath to help set the coating, e.g., wax material.
Figure 6:
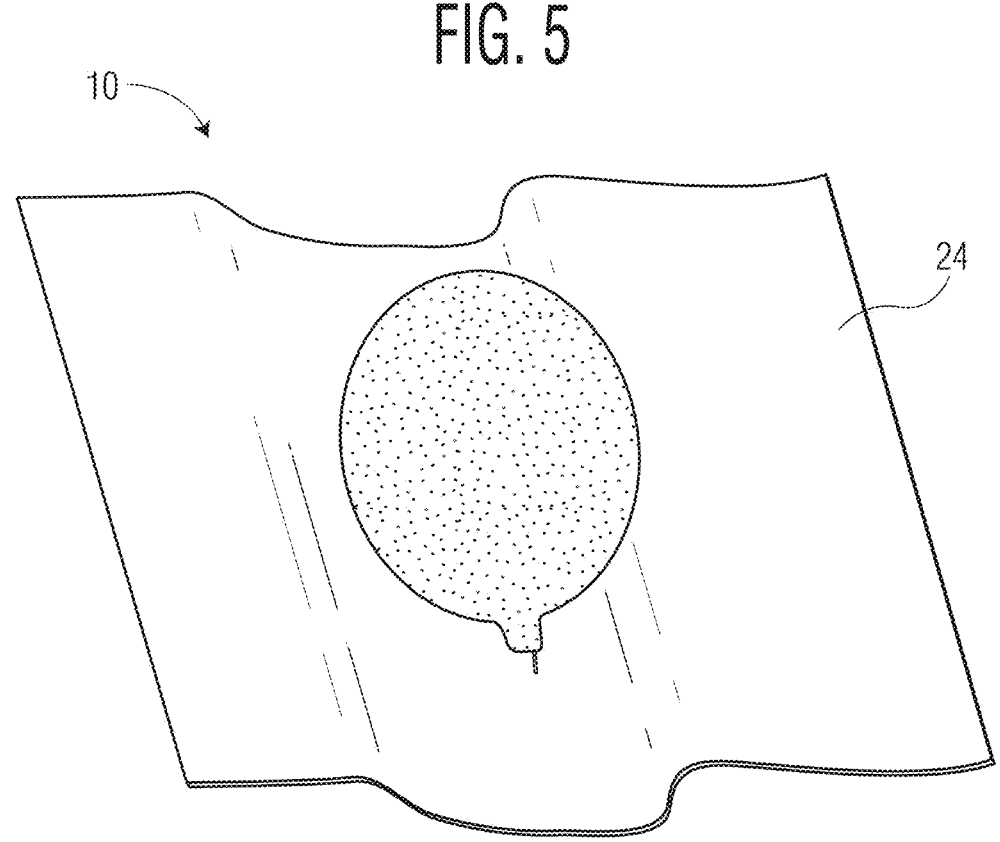
FIG. 6 is a top view of an egg product with the first coating layer and being dried from the cooling bath to be ready to receive another coating layer, e.g., a second coating layer.
Figure 7:
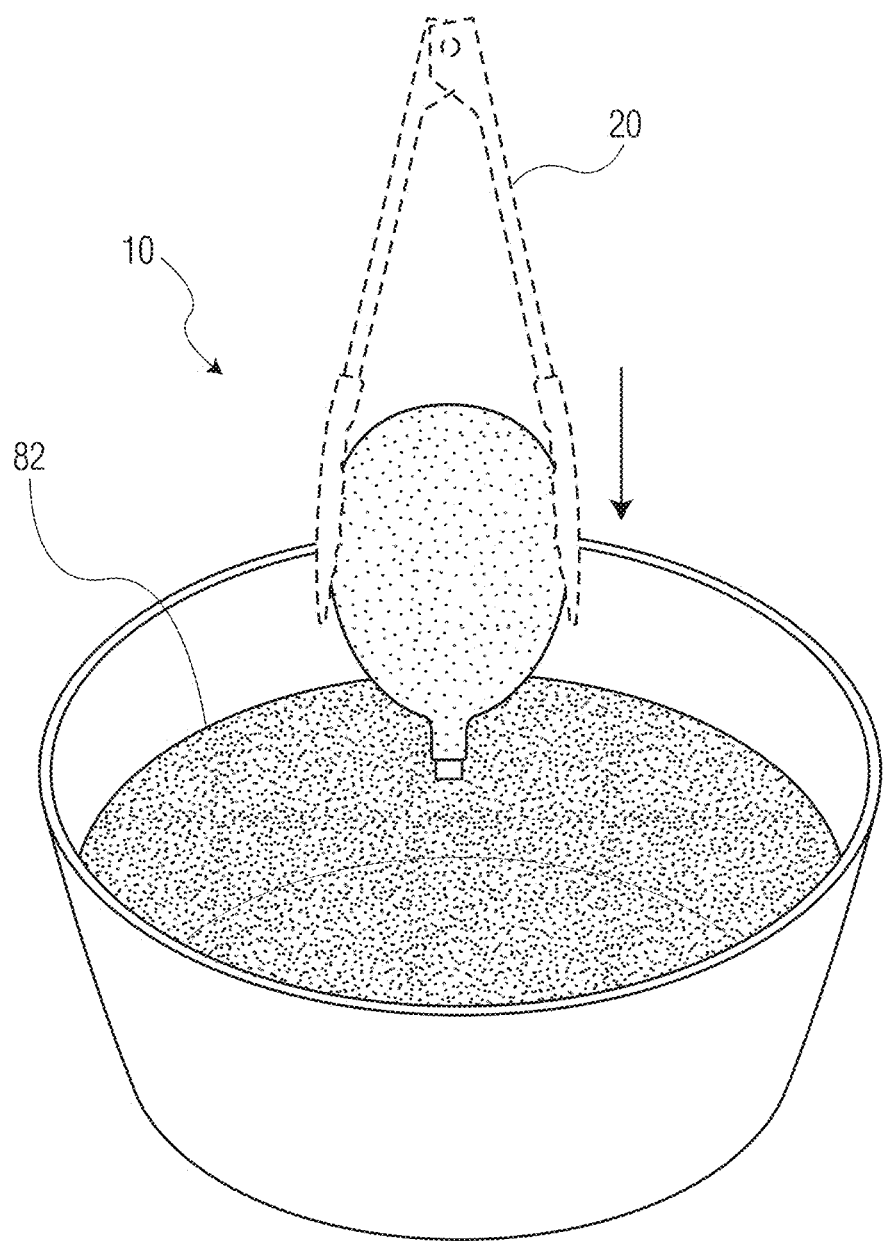
FIG. 7 is a side perspective view of the egg product seen in FIG. 6, now positioned to be dipped in the different material (e.g., molten wax) to form the second coating layer.
Figure 8:
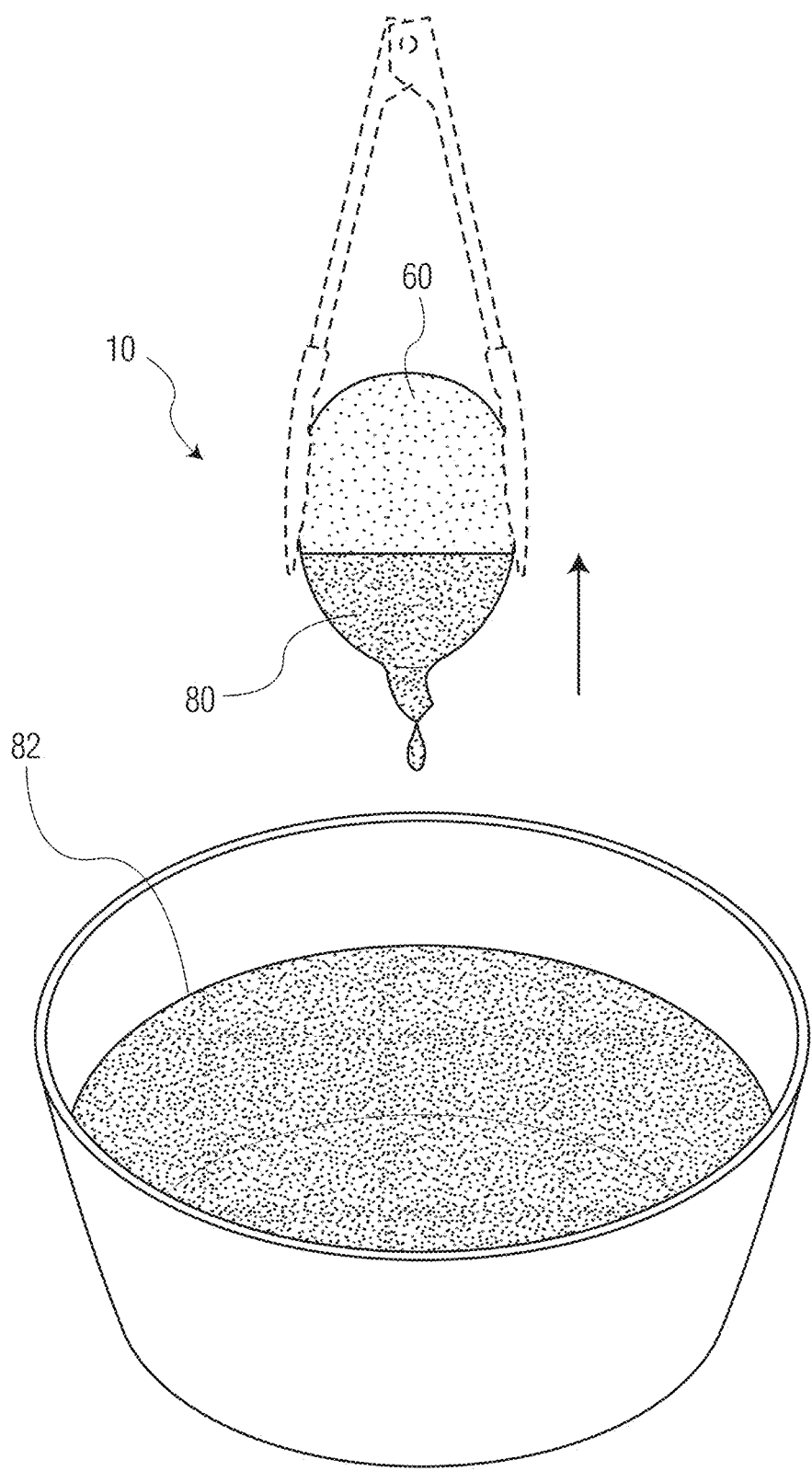
FIG. 8 is a side perspective view of the egg product seen in FIG. 7 after being dipped in the different material to form the second coating layer (i.e., multiple dippings like this may occur to form another and/or the second coating layer too)
Figure 9:
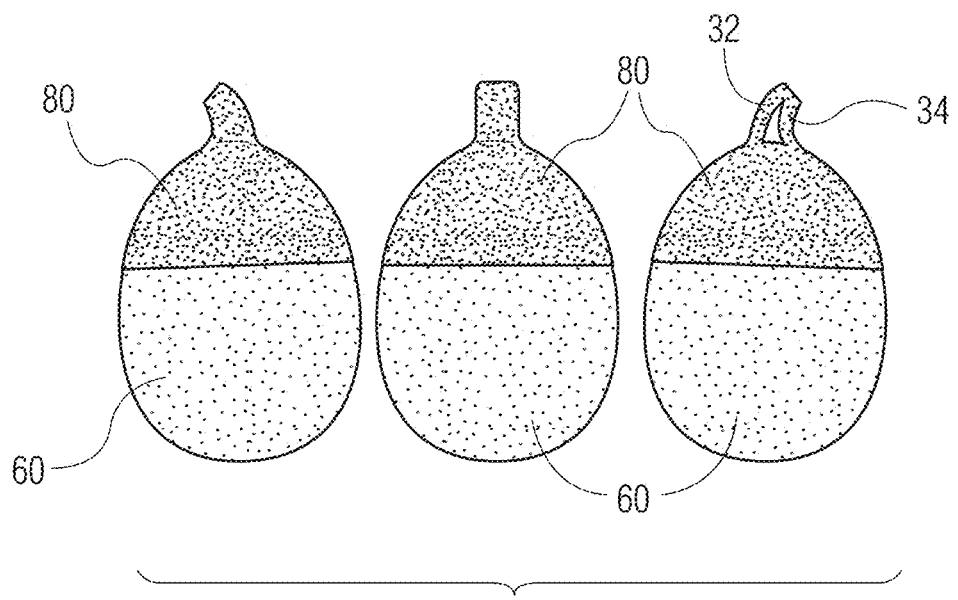
FIG. 9 is a front view of several examples of coated products disclosed here.

In yet further detail about how the method may be employed, reference is again made to, preferably, the sequential progression of steps from FIG. 1 to FIG. 11. That is, FIG. 1 is shell-less cooked egg product with strip 30 encircling at least a portion of the egg product circumference and ready to become coated shell-less cooked egg product. Moving to FIG. 2 is one shell-less cooked egg product suspended by a product holder 20 (e.g., fingers, tongs, etc.). And then in FIG. 3, the egg seen in FIG. 2 is about to be dipped in coating material 62 (e.g., such as molten liquid wax) that is in a container. Proceeding to FIG. 4, the egg product seen in FIG. 3 has just been dipped in, and is now removed from, coating material 62 to form a first coating layer. Next, in FIG. 5 there are egg products with the first coating layer in a cooling bath (e.g., with ice cubes 22) to help set the coating, e.g., wax material. The egg product then proceeds to a next step in FIG. 6, e.g., the first coating layer being dried at a drying area 24 from the cooling bath to be ready to receive another coating layer, e.g., a second coating layer. Then, FIG. 7 shows the egg product now positioned to be dipped in the different material 82 (e.g., molten wax) to form the second coating layer. After this, FIG. 8 depicts the egg product after being dipped in the different material 82 to form the second coating layer 80. Onto FIG. 9 it shows several examples of coated products, from different perspectives around the egg products, now completely made and ready for packaging, shipping and eventually consuming. To consume the egg product, one grasps one or both ends of the strip, and preferably one end is more readily available than the other to easily indicate to the user/consumer how to easily open the coated egg product. As seen in FIG. 10 the coated shell-less cooked egg product is being peeled open by its strip after the user grasps the first end of the strip. The strip can be partially to fully separated from the coating and the coating yet surrounding the egg product then pulled open where the strip was removed to then easily separate the egg product from the coating. As seen in FIG. 11 the coated shell-less cooked egg product of FIG. 10 is completely peeled open by its strip and the egg product separated from the coating layer(s) and fully intact and ready to eat. Surprisingly, the challenges the inventors encountered to effectively handle and make the coated shell-less cooked egg product now aid in a more efficient and effective removal of the egg product from the coating.

Additional discussion of embodiments A through GG:

A. A coated shell-less cooked egg product including:
   (i) a shell-less cooked egg product;
   (ii) a strip encircling at least 50% of a circumference of the egg product, the egg product having a first end and a second end; and,
   (iii) a coating enclosing:
      (a) substantially all of a surface area of the egg product and
      (b) at least 75% of the strip and as much as 100% of the strip, wherein at least a first end of the strip extends away from the egg product so the first end of the strip can be grasped to assist in removal of the coating from the egg product during a peeling phase.

B. The coated shell-less cooked egg product of embodiment A, where the coating includes a first coating layer and a second coating layer.

C. The coated shell-less cooked egg product of any prior embodiment, where the first coating layer encloses:
   (i) the first end of the egg and at least 50% of the surface area of the egg and
   (ii) at least 50% to less than 100% of the strip.

D. The coated shell-less cooked egg product of any prior embodiment, where the second coating layer encloses:
   (i) between 10% and 90% of a surface area of the first coating layer including the second end of the egg and
   (ii) substantially all of the strip that is not enclosed by the first coating layer.

E. The coated shell-less cooked egg product of any prior embodiment, where the first coating layer encloses the first end of the egg and between 50% and 90% of the surface area of the egg.

F. The coated shell-less cooked egg product of any prior embodiment, where at least one of the first coating layer and the second coating layer is a wax material.

G. The coated shell-less cooked egg product of any prior embodiment, where the second coating layer is of a different wax material from the wax material of the first coating.

H. The coated shell-less cooked egg product of any prior embodiment, where the different wax material includes a color difference.

I. The coated shell-less cooked egg product of any prior embodiment, where the wax material includes a blend of paraffin wax and microcrystalline wax.

J. The coated shell-less cooked egg product of any prior embodiment, where the circumference of the egg product is a longitudinal circumference comprising the first end and the second end of the egg product.

K. The coated shell-less cooked egg product of any prior embodiment, where a surface of the egg product is resilient.

L. The coated shell-less cooked egg product of any prior embodiment, where the strip includes a pre-coating layer.

M. The coated shell-less cooked egg product of any prior embodiment, where the pre-coating is a wax material.

N. The coated shell-less cooked egg product of any prior embodiment, where the wax material has a coefficient of friction relative to a surface of the egg product and the coefficient of friction is sufficient to reduce movement of the egg product relative to the strip when the strip encircles the egg product.

O. The coated shell-less cooked egg product of any prior embodiment, where the strip is a cloth material.

P. The coated shell-less cooked egg product of claim 1, where the strip includes a cradle at the first or second end of the egg product.

Q. The coated shell-less cooked egg product of any prior embodiment, where the cradle includes an open seat member or an X-shaped member.

R. The coated shell-less cooked egg product of any prior embodiment, where the strip encircles less than 100% of the circumference of the egg product.

S. The coated shell-less cooked egg product of any prior embodiment, where the egg product includes a cooked whole egg.

T. The coated shell-less cooked egg product of any prior embodiment, where the egg product includes a salt added to at least a surface of the egg product.

U. The coated shell-less cooked egg product of any prior embodiment, where the egg product includes an acetic acid added to at least a surface of the egg product.

V. The coated shell-less cooked egg product of any prior embodiment, where the egg product is egg shaped.

W. A method for making a coated shell-less cooked egg product comprising:
   (i) providing a shell-less cooked egg product;
   (ii) encircling at least 50% of a circumference of the egg product with a strip, the egg product having a first end and a second end;
   (ii) enclosing (a) substantially all of a surface area of the egg product with a coating and (b) at least 75% of the strip and as much as 100% of the strip with the coating; and,
   (iii) extending at least a first end of the strip away from the egg product so the first end of the strip can be grasped to assist in removal of the coating from the egg product during a peeling step.

X. The method of any prior method embodiment, where enclosing includes a first layer coating (i) the first end of the egg and at least 50% of the surface area of the egg and (ii) at least 50% to less than 100% of the strip.

Y. The method of any prior method embodiment, where enclosing further includes a second layer coating (i) between 10% and 90% of a surface area of the first layer including the second end of the egg and (ii) substantially all of the strip that is not enclosed by the first layer.

Z. The method of any prior method embodiment, where the first layer coating step includes coating the first end of the egg and between 50% and 90% of the surface area of the egg.

AA. The method of any prior method embodiment, where the encircling step includes less than 100% of the circumference of the egg product.

BB. The method of any prior method embodiment, further comprising cradling the first end of the egg product with the strip and suspending the egg product with the strip proximate to the second end of the egg product.

CC. The method of any prior method embodiment, further comprising exposing the egg product by peeling the strip away from the egg product.

DD. The method of any prior method embodiment, where peeling includes grasping the first end of the strip.

EE. The method of any prior method embodiment, further comprising coating the strip in a pre-coating layer.

FF. The method of any prior method embodiment, further comprising adding salt to at least a surface of the egg product.

GG. The method of any prior method embodiment, further comprising adding an acetic acid to at least a surface of the egg product.

The present coated product includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the packaging arts and/or food manufacturing arts, and all such modifications and other embodiments are intended and deemed to be within the scope of the present coated product.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

What is claimed is:

1. A coated shell-less cooked egg product comprising:
   a shell-less cooked egg product;
   a strip encircling at least 50% of a circumference of the egg product, the egg product having a first end and a second end; and,
   a coating enclosing:
   (i) substantially all of a surface area of the egg product and
   (ii) at least 75% of the strip and as much as 100% of the strip, wherein at least a first end of the strip extends away from the egg product so the first end of the strip can be grasped to assist in removal of the coating from the egg product during a peeling phase.

2. The coated shell-less cooked egg product of claim 1, wherein the coating comprises a first coating layer and a second coating layer.

3. The coated shell-less cooked egg product of claim 2, wherein the first coating layer encloses:
   (i) the first end of the egg and at least 50% of the surface area of the egg and
   (ii) at least 50% to less than 100% of the strip.

4. The coated shell-less cooked egg product of claim 3, wherein the second coating layer encloses:
   (i) between 10% and 90% of a surface area of the first coating layer including the second end of the egg and
   (ii) substantially all of the strip that is not enclosed by the first coating layer.

5. The coated shell-less cooked egg product of claim 4, wherein the first coating layer encloses the first end of the egg and between 50% and 90% of the surface area of the egg.

6. The coated shell-less cooked egg product of claim 2, wherein at least one of the first coating layer and the second coating layer is a wax material.

7. The coated shell-less cooked egg product of claim 6, wherein the second coating layer is of a different wax material from the wax material of the first coating.

8. The coated shell-less cooked egg product of claim 7, wherein the different wax material comprises a color difference.

9. The coated shell-less cooked egg product of claim 6, wherein the wax material comprises a blend of paraffin wax and microcrystalline wax.

10. The coated shell-less cooked egg product of claim 1, wherein the circumference of the egg product is a longitudinal circumference comprising the first end and the second end of the egg product.

11. The coated shell-less cooked egg product of claim 1, wherein a surface of the egg product is resilient.

12. The coated shell-less cooked egg product of claim 1, wherein the strip includes a pre-coating layer.

13. The coated shell-less cooked egg product of claim 12, wherein the pre-coating is a wax material.

14. The coated shell-less cooked egg product of claim 13, wherein the wax material has a coefficient of friction relative to a surface of the egg product and the coefficient of friction is sufficient to reduce movement of the egg product relative to the strip when the strip encircles the egg product.

15. The coated shell-less cooked egg product of claim 1, wherein the strip is a cloth material.

16. The coated shell-less cooked egg product of claim 1, wherein the strip includes a cradle at the first or second end of the egg product.

17. The coated shell-less cooked egg product of claim 16, wherein the cradle comprises an open seat member or an X-shaped member.

18. The coated shell-less cooked egg product of claim 1, wherein the strip encircles less than 100% of the circumference of the egg product.

19. The coated shell-less cooked egg product of claim 1, wherein the egg product comprises a cooked whole egg.

20. The coated shell-less cooked egg product of claim 1, wherein the egg product comprises a salt added to at least a surface of the egg product.

21. The coated shell-less cooked egg product of claim 1, wherein the egg product comprises an acetic acid added to at least a surface of the egg product.

22. The coated shell-less cooked egg product of claim 20, wherein the egg product comprises an acetic acid added to at least the surface of the egg product.

23. The coated shell-less cooked egg product of claim 1, wherein the egg product is egg shaped.

24. A coated shell-less cooked egg product comprising:
    a shell-less cooked egg product;
    a strip encircling at least 50% of a longitudinal circumference comprising a first end a second end of the egg product; and,
    a coating enclosing:
    (i) substantially all of a surface area of the egg product and
    (ii) at least 75% of the strip and as much as 100% of the strip, wherein at least a first end of the strip extends away from the egg product so the first end of the strip can be grasped to assist in removal of the coating from the egg product during a peeling phase; and,
    the coating comprises a first coating layer and a second coating layer wherein the first coating layer encloses:
    (i) the first end of the egg and at least 50% of the surface area of the egg and
    (ii) at least 50% to less than 100% of the strip.

25. A coated shell-less cooked egg product comprising:
    a shell-less cooked egg product;
    a strip encircling at least 50% of a circumference of the egg product, the egg product having a first end and a second end and a surface of the egg product is resilient;
    a coating enclosing:
    (i) substantially all of a surface area of the egg product and
    (ii) at least 75% of the strip and as much as 100% of the strip, wherein at least a first end of the strip extends away from the egg product so the first end of the strip can be grasped to assist in removal of the coating from the egg product during a removal peeling; and,
    a salt and an acetic acid added to at least the surface of the egg product.

26. A coated shell-less cooked egg product comprising:
    a shell-less cooked egg product;
    a strip encircling at least 50% and less than 100% of a circumference of the egg product, the egg product having a first end and a second end;
    a coating enclosing:
    (i) substantially all of a surface area of the egg product and
    (ii) at least 75% of the strip and as much as 100% of the strip, wherein at least a first end of the strip extends away from the egg product so the first end of the strip can be grasped to assist in removal of the coating from the egg product during a peeling phase;

the coating comprises a first coating layer and a second coating layer wherein the first coating layer encloses:
(i) the first end of the egg and at least 50% of the surface area of the egg and
(ii) at least 50% to less than 100% of the strip;

the second coating layer encloses:
(i) between 10% and 90% of a surface area of the first coating layer including the second end of the egg and
(ii) substantially all of the strip that is not enclosed by the first coating layer; and, a salt added to at least a surface of the egg product.

27. A method for making a coated shell-less cooked egg product comprising:
providing a shell-less cooked egg product;
encircling at least 50% of a circumference of the egg product with a strip, the egg product having a first end and a second end;
enclosing (i) substantially all of a surface area of the egg product with a coating and (ii) at least 75% of the strip and as much as 100% of the strip with the coating; and,
extending at least a first end of the strip away from the egg product so the first end of the strip can be grasped to assist in removal of the coating from the egg product during a peeling step.

28. The method of claim 27, wherein enclosing comprises:
a first layer coating (i) the first end of the egg and at least 50% of the surface area of the egg and (ii) at least 50% to less than 100% of the strip.

29. The method of claim 28, wherein enclosing further comprises:
a second layer coating (i) between 10% and 90% of a surface area of the first layer including the second end of the egg and (ii) substantially all of the strip that is not enclosed by the first layer.

30. The method of claim 27, wherein the first layer coating step comprises coating the first end of the egg and between 50% and 90% of the surface area of the egg.

31. The method of claim 27, wherein the encircling step comprises less than 100% of the circumference of the egg product.

32. The method of claim 27, further comprising cradling the first end of the egg product with the strip and suspending the egg product with the strip proximate to the second end of the egg product.

33. The method of claim 27, further comprising exposing the egg product by peeling the strip away from the egg product.

34. The method of claim 33, wherein peeling comprises grasping the first end of the strip.

35. The method of claim 27, further comprising coating the strip in a pre-coating layer.

36. The method of claim 27, further comprising adding salt to at least a surface of the egg product.

37. The method of claim 27, further comprising adding an acetic acid to at least a surface of the egg product.

* * * * *